US010006684B2

(12) United States Patent
Connell et al.

(10) Patent No.: US 10,006,684 B2
(45) Date of Patent: Jun. 26, 2018

(54) AIR CONDITIONING SYSTEM FOR USE IN VEHICLE

(71) Applicant: Bergstrom, Inc., Rockford, IL (US)

(72) Inventors: Brett S. Connell, Winnebago, IL (US); Brett J. Herrmann, Rochelle, IL (US); Terry Zeigler, Byron, IL (US)

(73) Assignee: Bergstrom, Inc., Rockford, IL (US)

(*) Notice: Subject to any disclaimer, the term of this patent is extended or adjusted under 35 U.S.C. 154(b) by 114 days.

(21) Appl. No.: 14/965,142

(22) Filed: Dec. 10, 2015

(65) Prior Publication Data

US 2017/0167757 A1 Jun. 15, 2017

(51) Int. Cl.
| | |
|---|---|
| *F25B 49/02* | (2006.01) |
| *F25B 5/02* | (2006.01) |
| *F25B 6/02* | (2006.01) |
| *F25B 41/04* | (2006.01) |

(52) U.S. Cl.
CPC ............... *F25B 49/02* (2013.01); *F25B 5/02* (2013.01); *F25B 6/02* (2013.01); *F25B 41/04* (2013.01); *F25B 2600/2519* (2013.01)

(58) Field of Classification Search
CPC .... F25B 5/02; F25B 41/02; F25B 2600/2519; F25B 2700/2117; F25B 2600/2511; B60H 1/004; B60H 1/00428; B60H 2001/00121; B60H 2001/3241; B60H 1/3208
USPC .............................. 62/175, 199, 200, 509, 133
See application file for complete search history.

(56) References Cited

U.S. PATENT DOCUMENTS

| | | | |
|---|---|---|---|
| 2,722,050 | A | 11/1955 | Shank |
| 2,789,234 | A | 6/1956 | Lambert et al. |
| 3,590,910 | A | 7/1971 | Lorenz |
| 3,627,030 | A | 12/1971 | Lorenz |

(Continued)

FOREIGN PATENT DOCUMENTS

| | | |
|---|---|---|
| DE | 4440044 A1 | 5/1996 |
| DE | 10014483 A1 | 11/2000 |

(Continued)

OTHER PUBLICATIONS

Anonymous: "NITE Connected Climate Controlled Transport Monitoring/Mobile Internet of Things UI Design/Mobil UI: Progress/Printers/Internet of Things, User Inter . . . ," Oct. 19, 2016 retrieved from: URL:htps://za.pinterest.com/pin/192810427773981541/, 1 pgs.

(Continued)

*Primary Examiner* — Marc Norman
(74) *Attorney, Agent, or Firm* — Morgan, Lewis & Bockius LLP

(57) ABSTRACT

An air conditioning system for use in a vehicle includes at least one compressor, a condenser disposed downstream of the at least one compressor and a plurality of evaporators disposed downstream of the condenser with first and second evaporators fluidly coupled to each other in parallel. The at least one compressor, the condenser, and the plurality of evaporators are fluidly connected by refrigerant lines to form a refrigerant circuit. The air conditioning system also includes a plurality of shut-off valves, with one shut-off valve installed at a refrigerant inlet and another shut-off valve installed at a refrigerant outlet of the first evaporator. The shut-off valves are controlled to prevent undesired collection of refrigerant in the first evaporator.

21 Claims, 7 Drawing Sheets

(56) References Cited

U.S. PATENT DOCUMENTS

| | | |
|---|---|---|
| 3,807,087 A | 4/1974 | Staats |
| 3,844,130 A | 10/1974 | Wahnish |
| 3,885,398 A | 5/1975 | Dawkins |
| 3,948,060 A * | 4/1976 | Gaspard .................. F24F 5/001 62/175 |
| 3,995,443 A | 12/1976 | Iversen |
| 4,015,182 A | 3/1977 | Erdman |
| 4,217,764 A | 8/1980 | Armbruster |
| 4,271,677 A | 6/1981 | Harr |
| 4,280,330 A | 7/1981 | Harris et al. |
| 4,324,286 A | 4/1982 | Brett |
| 4,359,875 A | 11/1982 | Ohtani |
| 4,412,425 A | 11/1983 | Fukami |
| 4,448,157 A | 5/1984 | Eckstein et al. |
| 4,459,519 A | 7/1984 | Erdman |
| 4,577,679 A | 3/1986 | Hibshman |
| 4,604,036 A | 8/1986 | Sutou et al. |
| 4,617,472 A | 10/1986 | Slavik |
| 4,641,502 A | 2/1987 | Aldrich et al. |
| 4,658,593 A | 4/1987 | Stenvinkel |
| 4,667,480 A | 5/1987 | Bessler |
| 4,694,798 A | 9/1987 | Kato et al. |
| 4,748,825 A | 6/1988 | King |
| 4,825,663 A | 5/1989 | Nijar et al. |
| 4,841,733 A | 6/1989 | Dussault et al. |
| 4,856,078 A | 8/1989 | Konopka |
| 4,893,479 A | 1/1990 | Gillett et al. |
| 4,945,977 A | 8/1990 | D'Agaro |
| 4,947,657 A | 8/1990 | Kalmbach |
| 4,982,576 A | 1/1991 | Proctor et al. |
| 5,025,634 A | 6/1991 | Dressler |
| 5,046,327 A | 9/1991 | Walker |
| 5,067,652 A | 11/1991 | Enander |
| 5,095,308 A | 3/1992 | Hewitt |
| 5,125,236 A | 6/1992 | Clancey et al. |
| 5,170,639 A | 12/1992 | Datta |
| 5,275,012 A | 1/1994 | Dage et al. |
| 5,307,645 A | 5/1994 | Pannell |
| 5,316,074 A | 5/1994 | Isaji et al. |
| 5,333,678 A | 8/1994 | Mellum et al. |
| 5,361,593 A | 11/1994 | Dauvergne |
| 5,376,866 A | 12/1994 | Erdman |
| 5,396,779 A | 3/1995 | Voss |
| 5,402,844 A | 4/1995 | Elluin |
| 5,404,730 A | 4/1995 | Westmeyer |
| 5,465,589 A | 11/1995 | Bender et al. |
| 5,497,941 A | 3/1996 | Numazawa et al. |
| 5,501,267 A | 3/1996 | Iritani et al. |
| 5,502,365 A | 3/1996 | Nanbu et al. |
| 5,524,442 A | 6/1996 | Bergmen, Jr. et al. |
| 5,528,901 A | 6/1996 | Willis |
| 5,562,538 A | 10/1996 | Suyama |
| 5,586,613 A | 12/1996 | Ehsani |
| 5,657,638 A | 8/1997 | Erdman et al. |
| 5,682,757 A | 11/1997 | Peterson |
| 5,761,918 A | 6/1998 | Jackson et al. |
| 5,782,610 A | 7/1998 | Ikeda |
| 5,819,549 A | 10/1998 | Sherwood |
| 5,896,750 A | 4/1999 | Karl |
| 5,898,995 A | 5/1999 | Ghodbane |
| 5,899,081 A | 5/1999 | Evans et al. |
| 5,901,572 A | 5/1999 | Peiffer et al. |
| 5,901,780 A | 5/1999 | Zeigler et al. |
| 5,921,092 A | 7/1999 | Behr et al. |
| 5,934,089 A | 8/1999 | Makagawa et al. |
| 5,982,643 A | 11/1999 | Phlipot |
| 6,016,662 A | 1/2000 | Tanaka et al. |
| 6,028,406 A | 2/2000 | Birk |
| 6,038,877 A | 3/2000 | Peiffer et al. |
| 6,038,879 A | 3/2000 | Turcotte |
| 6,059,016 A | 5/2000 | Rafalovich et al. |
| 6,073,456 A | 6/2000 | Kawai et al. |
| 6,111,731 A | 8/2000 | Cepynsky |
| 6,112,535 A | 9/2000 | Hollenbeck |
| 6,134,901 A | 10/2000 | Harvest et al. |
| 6,152,217 A | 11/2000 | Ito et al. |
| 6,205,795 B1 | 3/2001 | Backman et al. |
| 6,205,802 B1 | 3/2001 | Drucker et al. |
| 6,209,333 B1 | 4/2001 | Bascobert |
| 6,213,867 B1 | 4/2001 | Yazici |
| 6,230,507 B1 | 5/2001 | Ban et al. |
| 6,253,563 B1 | 7/2001 | Ewert et al. |
| 6,276,161 B1 | 8/2001 | Peiffer et al. |
| 6,282,919 B1 | 9/2001 | Rockenfeller |
| 6,351,957 B2 | 3/2002 | Hara |
| 6,405,793 B1 | 6/2002 | Ghodbane et al. |
| 6,411,059 B2 | 6/2002 | Frugier et al. |
| 6,453,678 B1 | 9/2002 | Sundhar |
| 6,457,324 B2 | 10/2002 | Zeigler et al. |
| 6,467,279 B1 | 10/2002 | Backman et al. |
| 6,474,081 B1 | 11/2002 | Feuerecker |
| 6,530,426 B1 | 3/2003 | Kishita et al. |
| 6,543,245 B1 * | 4/2003 | Waldschmidt ....... B60H 1/3211 62/199 |
| 6,571,566 B1 | 6/2003 | Temple et al. |
| 6,626,003 B1 | 9/2003 | Kortüm et al. |
| 6,684,863 B2 | 2/2004 | Dixon et al. |
| 6,725,134 B2 | 4/2004 | Dillen et al. |
| 6,745,585 B2 | 6/2004 | Kelm et al. |
| 6,748,750 B2 | 6/2004 | Choi |
| 6,758,049 B2 | 7/2004 | Adachi et al. |
| 6,889,762 B2 | 5/2005 | Zeigler et al. |
| 6,932,148 B1 | 8/2005 | Brummett et al. |
| 6,939,114 B2 | 9/2005 | Iwanami et al. |
| 6,965,818 B2 | 11/2005 | Koenig et al. |
| 6,981,544 B2 | 1/2006 | Iwanami et al. |
| 7,150,159 B1 | 12/2006 | Brummett et al. |
| 7,316,119 B2 | 1/2008 | Allen |
| 7,350,368 B2 | 4/2008 | Heberle et al. |
| 7,591,143 B2 | 9/2009 | Zeigler et al. |
| 7,591,303 B2 | 9/2009 | Zeigler et al. |
| 7,765,824 B2 * | 8/2010 | Wong .................. B60H 1/3226 62/133 |
| 8,001,799 B2 * | 8/2011 | Obayashi ........... B60H 1/00492 62/199 |
| 8,156,754 B2 | 4/2012 | Hong et al. |
| 8,517,087 B2 | 8/2013 | Zeigler et al. |
| 8,919,140 B2 | 12/2014 | Johnson et al. |
| 8,947,531 B2 | 2/2015 | Fischer et al. |
| 9,216,628 B2 | 12/2015 | Self et al. |
| 2001/0010261 A1 | 8/2001 | Oomura et al. |
| 2002/0020183 A1 | 2/2002 | Hayashi |
| 2002/0026801 A1 | 3/2002 | Yamashita |
| 2002/0078700 A1 | 6/2002 | Kelm et al. |
| 2002/0084769 A1 | 7/2002 | Iritani et al. |
| 2002/0108384 A1 | 8/2002 | Higashiyama |
| 2002/0112489 A1 | 8/2002 | Egawa et al. |
| 2002/0157412 A1 | 10/2002 | Iwanami et al. |
| 2002/0157413 A1 | 10/2002 | Iwanami et al. |
| 2003/0041603 A1 | 3/2003 | Tada et al. |
| 2003/0105567 A1 | 6/2003 | Koenig et al. |
| 2003/0106332 A1 | 6/2003 | Okamoto |
| 2004/0060312 A1 | 4/2004 | Horn et al. |
| 2004/0168449 A1 | 9/2004 | Homan et al. |
| 2005/0016196 A1 | 1/2005 | Kadle et al. |
| 2005/0109499 A1 | 5/2005 | Iwanami et al. |
| 2005/0161211 A1 | 7/2005 | Zeigler et al. |
| 2005/0230096 A1 | 10/2005 | Yamaoka |
| 2005/0257545 A1 * | 11/2005 | Ziehr ..................... B60H 1/004 62/236 |
| 2006/0042284 A1 | 3/2006 | Heberle et al. |
| 2006/0102333 A1 | 5/2006 | Zeigler et al. |
| 2006/0151163 A1 | 7/2006 | Zeigler et al. |
| 2006/0151164 A1 | 7/2006 | Zeigler et al. |
| 2007/0131408 A1 | 6/2007 | Zeigler et al. |
| 2007/0163276 A1 | 7/2007 | Braun et al. |
| 2007/0227167 A1 | 10/2007 | Shapiro |
| 2008/0110185 A1 | 5/2008 | Veettil et al. |
| 2008/0156887 A1 | 7/2008 | Stanimirovic |
| 2008/0196436 A1 | 8/2008 | Connell |
| 2008/0196877 A1 | 8/2008 | Zeigler et al. |
| 2009/0229288 A1 | 9/2009 | Alston et al. |
| 2009/0301702 A1 | 12/2009 | Zeigler et al. |
| 2010/0218530 A1 | 9/2010 | Melbostad et al. |

(56) References Cited

U.S. PATENT DOCUMENTS

| | | |
|---|---|---|
| 2011/0308265 A1 | 12/2011 | Phannavong |
| 2012/0102779 A1 | 5/2012 | Beers et al. |
| 2012/0118532 A1 | 5/2012 | Jentzsch et al. |
| 2012/0247135 A1 | 10/2012 | Fakieh |
| 2012/0318014 A1 | 12/2012 | Huff et al. |
| 2013/0167577 A1 | 7/2013 | Street |
| 2013/0319630 A1 | 12/2013 | Yamamoto |
| 2014/0066572 A1 | 3/2014 | Corveleyn |
| 2014/0075973 A1 | 3/2014 | Graaf et al. |
| 2014/0241926 A1 | 8/2014 | Fraser |
| 2014/0290299 A1 | 10/2014 | Nakaya |
| 2015/0158368 A1 | 6/2015 | Herr-Rathke et al. |
| 2015/0210287 A1 | 7/2015 | Penilla et al. |
| 2015/0239365 A1 | 8/2015 | Hyde et al. |
| 2015/0306937 A1 | 10/2015 | Kitamura et al. |

FOREIGN PATENT DOCUMENTS

| | | |
|---|---|---|
| DE | 102005004950 A1 | 8/2006 |
| DE | 102010054965 A1 | 6/2012 |
| EP | 0516413 A1 | 12/1992 |
| EP | 0958952 A1 | 11/1999 |
| EP | 1024038 A2 | 8/2000 |
| EP | 1477748 A1 | 11/2004 |
| EP | 1700725 A1 | 9/2006 |
| EP | 1970651 A1 | 9/2008 |
| EP | 2048011 A1 | 4/2009 |
| EP | 2894420 A1 | 7/2015 |
| EP | 0963895 A2 | 12/2015 |
| FR | 2966391 A1 | 4/2012 |
| JP | 5032121 A | 2/1993 |
| JP | H07186711 A | 7/1995 |
| JP | H97-76740 | 3/1997 |
| JP | H-09318177 A | 12/1997 |
| JP | 2000108651 A | 4/2000 |
| JP | 2005044551 A | 4/2000 |
| JP | 2002081823 A | 3/2002 |
| JP | 2006-264568 A | 10/2006 |
| JP | 2012017029 A | 1/2012 |
| JP | 2014226979 A | 12/2014 |
| WO | WO 89/09143 A1 | 10/1989 |
| WO | WO 99/61269 | 12/1999 |
| WO | WO 00/00361 | 1/2000 |
| WO | WO 2006/082082 A1 | 8/2006 |
| WO | WO 2014/112320 A1 | 7/2014 |

OTHER PUBLICATIONS

Bergstrom, Inc., International Search Report and Written Opinion, PCT/US2013/068331, dated Nov. 7, 2014, 9 pgs.

Bergstrom, Inc., International Search Report and Written Opinion, PCT/US2016/021602, dated Nov. 3, 2016, 17 pgs.

Alfa Laval Website http://www.alfalaval.com/ecore-Java/WebObjects/ecoreJava.woa/wa/shoNode?siteNode1ID=1668&cont . . . ; date last visited May 18, 2007; 1 page.

Bergstrom, Inc., International Search Report and Written Opinion, PCT/US2014/026687, dated Jul. 28, 2014, 12 pgs.

Bergstrom, Inc., International Preliminary Report on Patentability, PCT/US2014/026687, dated Sep. 15, 2015, 7 pgs.

Bergstrom, Inc., International Search Report and Written Opinion, PCT/US2014/026683, dated Jul. 3, 2014 12 pgs.

Bergstrom, Inc., International Preliminary Report on Patentability, PCT/US2014/026683, dated Sep. 15, 2015, 6 pgs.

Bergstrom, Inc., International Preliminary Report on Patentability, PCT/US2013/068331, dated May 10, 2016, 6 pgs.

Bergstrom, Inc., Communication Pursuant to Rules 161(2) and 162 EPC, EP14717604.4, dated Oct. 23, 2015, 2 pgs.

Bergstrom, Inc., Communication Pursuant to Rules 161(2) and 162 EPC, EP14722438.0, dated Nov. 2, 2015. 2 pgs.

Bergstrom, Inc., Communication Pursuant to Rules 161(2) and 162 EPC, EP13795064.8, dated Jun. 22, 2016, 2 pgs.

Connell, Office Action, U.S. Appl. No. 14/209,877, dated Nov. 27, 2015, 19 pgs.

Connell, Final Office Action, U.S. Appl. No. 14/209,877, dated Jun. 22, 2016, 17 pgs.

Connell, Final Office Action, U.S. Appl. No. 14/209,961, dated Jul. 25, 2016, 15 pgs.

Connell, Office Action, U.S. Appl. No. 14/209 961, dated Dec. 2, 2015, 14 pgs.

FlatPlate Heat Exchangers; GEA FlatPiate Inc.; website—http://www.flatplate.com/profile.html; date last visited Aug. 9, 2007; 3 pages.

Glacier Bay Inc., Glacier Bay's Home Page, page printed from a website, htt(?:i/web.archive.org/web/19990417062255/htt[2://www.glacierbay.com/, apparent archive date: Apr. 17, 1999, 1 page.

Glacier Bay Inc., Darpa/Glacier Bay ECS, pages printed from a website, httir//web.archive.org/web/19991104132941/wvvw.glacierbay.com/darQatxt.htm, apparent archive date: Nov. 4, 1999, 2 pages.

Glacier Bay Inc., Glacier Bay ECS DARPA Project—Final Report, pages printed from a website, httn://web.archive.or_gjweb/19991103001512/v•vww,_g.Jacierbay.com/Darnhtm.htm, apparent archive date: Nov. 3, 1999, 9 pages.

Glacier Bay Inc., Glacier Bay ECS DARPA Project—Project Photos, pages printed from a website, http://web.archive.org/web/19991103012854/www.glacierbay.com/Dargghotos.htm, apparent archive date: Nov. 3, 1999, 2 pages.

Glacier Bay Inc., Glacier Bay ECS DARPA Project—Operational Video, page printed from a website, httQ://web.archive.orq/web/19991022221040/wvvw.qlacierbay.com/DarQvid.htm, apparent archive date Oct. 22, 1999; 1 page.

Glacier Bay Inc., R & D, pages printed from a website, htt://web.archive.org/web/20000121130306/www.glacierbay.com/R&D.htm, apparent archive date: Jan. 21, 2000, 2 pages.

Glacier Bay Inc., Company History, pages printed from a website, httg://web.archive.org/web/20000301153828/www .g!acierbay.corn/History:.htrn, apparent archive date: Mar. 1, 2000; 2 pages.

Glacier Bay Inc., Contact, page printed from a website, httQ://web.archive.orq/web/19990508104511/W\"I!V .qlacierba:t.com/Contact.htm, apparent archive date: May 8, 1999; 1 page.

Michael Löhle, Günther Feuerecker and Ulrich Salzer; Non Idling HVAC-modufe tor Long Distance Trucks;SAE TechnicalPaper Series 1999-01-1193; International Congress and Exposition, Detroit, Michigan; Mar. 1-4, 1999; 8 pages.

Mahmoud Ghodbane; On Vehicle Performance of a Secondary Loop A/C System; SAE Technical Paper Series 2000-01-1270; SAE 2000 World Congress, Detroit, Michigan; Mar. 6-9, 2000; 6 pages.

Masami Konaka and Hiroki Matsuo; SAE Technical Paper Series 2000-01-1271; SAE 2000 World Congress, Detroit, Michigan; Mar. 6-9, 2000; 7 pages.

Frank Stodolsky, Linda Gaines, and Anant Vyas; Analysis of Technology Options to Reduce the Fuel Consumption of Idling Trucks; Paper—Center for Transportation Research, Energy Systems Division, Argonne National Laboratory,9700 South Cass Avenue, Argonne, Illinois 60439;Jun. 2000; 30 pages.

Paper No. 26 in IPR2012-00027, Jun. 11, 2013, 12 pgs. (U.S. Pat. No. 7,591,303).

Patricia Gardie and Vincent Goetz; Thermal Energy Storage System by Solid Absorption for Electric Automobile Heating and Air-Conditioning; Paper; 1995, 5 pages.

TropiCool No-idle Heating & Cooling, 110V/12V High-efficiency, Self-contained, Electrified Heating/AC System; ACC Climate Control Brochure, Elkhart, Indiana; 2005, 1 page.

TropiCool Power Plus, More comfort. More efficiency. More options.; ACC Climate Control Brochure, Elkhart, Indiana; 2006, 3 pages.

Packless Industries, the leader in refrigerant to water coaxial heat exchangers, flexible hoses and sucti . . . ; website—http://www.packless.com/profile.htmle: date last visited Aug. 9, 2007; 1 page.

Zeigler, Office Action, U.S. Appl. No. 13/661,519, dated Mar. 11, 2013, 8 pgs.

Zeigler, Final Office Action, U.S. Appl. No. 13/661,519, dated Sep. 18, 2013, 15 pgs.

(56) References Cited

OTHER PUBLICATIONS

Zeigler, Office Action, U.S. Appl. No. 13/661,519, dated Apr. 9, 2014, 20 pgs.
Zeigler, Final Office Action, U.S. Appl. No. 13/661,519, dated Sep. 26, 2014, 23 pgs.
Zeigler, Office. Action U.S. Appl. No. 13/661,519, dated Oct. 28, 2015, 20 pgs.
Zeigler, Notice of Allowance, U.S. Appl. No. 13/661,519, dated Jun. 17, 2016, 8 pgs.
Bergstrom, Inc., Communication Pursuant to Article 94(3), EP14717604.4, dated Jun. 2, 2017, 12 pgs.
Bergstrom, Inc., Office Action, CN201480027137.4, dated Mar. 3, 2017, 15 pgs.
Bergstrom, Inc., Office Action, CN201480027117.7, dated Mar. 9, 2017, 8 pgs.
Connell, Final Office Action, U.S. Appl. No. 14/209,877, dated Dec. 29, 2016, 21 pgs.
Connell, Notice of Allowance, U.S. Appl. No. 14/209,877, dated May 16, 2017, 5 pgs.
Connell, Notice of Allowance, U.S. Appl. No. 14/209,961, dated Jun. 15, 2017, 10 pgs.
Connell, Final Office Action, U.S. Appl. No. 15/064,552, dated Jun. 1, 2017, 9 pgs.
Bergstrom, Inc., International Preliminary Report on Patentability, PCT/US2016/021602, dated Sep. 12, 2017, 11 pgs.
Bergstrom, Inc., International Search Report and Written Opinion, PCT/US2017/021346, dated Jul. 25, 2017, 11 pgs.
Bergstrom, Inc. Communication Pursuant to Article 94(3), EP14722438.0, dated Jan. 24, 2018, 5 pgs.
Bergstrom, Inc. Extended European Search Report, EP16204254.3, dated Jul. 25, 2017, 10 pgs.
Bergstrom, Inc. Partial European Search Report, EP16204259.2, dated May 30, 2017, 14 pgs.
Bergstrom, Inc. Extended European Search Report, EP16204259.2, dated Oct. 25, 2017, 15 pgs.
Bergstrom, Inc. Corrected Extended European Search Report, EP16204259.2, dated Nov. 24, 2017, 15 pgs.
Bergstrom, Inc. Partial European Search Report, EP16204256.8, dated Jul. 13, 2017, 14 pgs.
Bergstrom, Inc. Extended European Search Report, EP16204256.8, dated Dec. 1, 2017, 13 pgs.
Bergstrom, Inc., 2nd Office Action, CN201480027137.4, dated Jul. 13, 2017, 10 pgs.
Bergstrom, Inc., Patent Certificate, CN201480027117.7, dated Nov. 21, 2017, 3 pgs.
Connell, Notice of Allowance, U.S. Appl. No. 14/209,877, dated Aug. 4, 2017, 7 pgs.
Connell, Notice of Allowance, U.S. Appl. No. 14/995,119, dated Aug. 31, 2017, 7 pgs.
Connell, Office Action, U.S. Appl. No. 15/280,876, dated Dec. 14, 2017, 23 pgs.

* cited by examiner

AIR CONDITIONING SYSTEM FOR USE IN VEHICLE

FIELD OF THE INVENTION

The present invention generally relates to vehicle air conditioning systems, and more particularly, to over-the-road and off-road vehicle air conditioning systems that can prevent undesired collection of refrigerant in one or more evaporators.

BACKGROUND

In response to the needs of the transportation industry and the regulations governing the amount of time that a driver may spend behind the wheel, many vehicles include a cab compartment and a sleeper compartment where the driver or passenger can rest. To create a comfortable environment for drivers and passengers, vehicle heating, ventilation, and air conditioning (HVAC) systems have been developed to provide conditioned air to the cab and sleeper compartments.

Such vehicle HVAC systems may include multiple evaporators, one for each compartment. For example, a system may include a cab evaporator (e.g., an evaporator associated with the cab compartment to cool the cab compartment) and a sleeper evaporator (e.g., an evaporator associated with the sleeper compartment to cool the sleeper compartment). Such systems may also include multiple compressors connected to different power sources so that the vehicle HVAC systems can be operated when the engine of the vehicle is on and when it is off.

To meet a specific cooling demand and reduce waste of compressed and condensed refrigerant, the systems may be operated to allow the compressed and condensed refrigerant to pass through one or more of the evaporators while restricting the condensed refrigerant from passing through other evaporator(s). For example, in a case where cooling in the sleeper compartment is not desired (e.g., the sleeper compartment is not occupied), the systems may be operated to restrict the refrigerant from passing through the sleeper evaporator to reduce waste of the compressed and condensed refrigerant on an unoccupied compartment. Similarly, in a case where cooling in the cab compartment is not desired, the systems may be operated to restrict the refrigerant from passing through the cab compartment.

While restricting the refrigerant from passing through the non-operating evaporator or evaporators (e.g., the sleeper evaporator when cooling in the sleeper compartment is not desired or the cab evaporator where cooling in the cab compartment is not desired), conventional systems cannot prevent the collection or accumulation of the refrigerant in the non-operating evaporator(s), in particular at the lower pressure side of the non-operating evaporator(s). The collection or accumulation of the refrigerant in the non-operating evaporator(s) reduces the effective amount of the refrigerant that should be used to cool the compartment(s) in need of cooling, making it difficult to meet (in some circumstances, only partially meet) the cooling demand. Consequently, the cooling capacity and overall efficiency of the HVAC systems are reduced, and the operational costs are increased.

Given the above background, there is a need in the art for air conditioning systems with enhanced cooling efficiency and capacity that provide conditioned air to multiple compartments and that prevent undesired collection of refrigerant in non-operating evaporators.

The information disclosed in this Background section is provided for an understanding of the general background of the invention and is not an acknowledgement or suggestion that this information forms part of the prior art already known to a person skilled in the art.

SUMMARY

Various aspects of the present invention provide air conditioning systems with enhanced cooling efficiency and capacity that provide conditioned air to multiple compartments and that prevent the undesired collection of refrigerant in non-operating evaporators.

In one embodiment, the present invention provides an air conditioning system for use in a vehicle having two or more compartments. The air conditioning system includes at least one compressor, a condenser disposed downstream of the at least one compressor, a plurality of evaporators disposed downstream of the condenser, a plurality of shut-off valves and refrigerant lines. The refrigerant lines fluidly connect the at least one compressor, the condenser, and the plurality of evaporators to form a refrigerant circuit for circulating the refrigerant.

In a preferred embodiment, the plurality of evaporators includes a first evaporator and a second evaporator fluidly coupled to each other in parallel. When implemented in the vehicle, the first evaporator is in thermal communication with a first compartment of the vehicle to cool the first compartment and the second evaporator is in thermal communication with a second compartment of the vehicle to cool the second compartment. The plurality of shut-off valves includes a first shut-off valve and a second shut-off valve. The first shut-off valve is installed at a refrigerant inlet of the first evaporator and the second shut-off valve is installed at a refrigerant outlet of the first evaporator. The first and second shut-off valves are controlled to prevent refrigerant from collecting in the first evaporator. In some embodiments, the first and second shut-off valves are controlled to prevent refrigerant from collecting in the first evaporator when airflow over or through the first evaporator is less than a first predetermined volume.

In some embodiments, the air conditioning system further includes a first sensor and a controller electrically coupled to the first sensor and the first and second shot-off valves. The first sensor is configured to perform one or more of the following: (i) measure temperature of the first evaporator and (ii) measure airflow passing over the first evaporator. The controller is configured to control the operation of the first and second shut-off valves in accordance with the measured temperature or the measured airflow or both. In some embodiments, the controller is configured to automatically close the first and second shut-off valves when the measured temperature of the first evaporator is lower than a first predetermined temperature, or when the measured airflow passing over the first evaporator is less than a first predetermined volume, and to automatically open the first and second shut-off valves when the measured temperature of the first evaporator exceeds the first predetermined temperature, or when the measured airflow passing over the first evaporator is equal to or greater than the first predetermined volume. In an embodiment, the method includes manually and selectively opening or closing the first and second shut-off valves in accordance with temperature of the first evaporator or airflow passing over the first evaporator.

In another embodiment, the present invention provides an air conditioning system for use in a vehicle having two or more compartments. The air conditioning system includes at least one compressor, a condenser disposed downstream of the at least one compressor, a plurality of evaporators disposed downstream of the condenser, a plurality of shut-off valves, refrigerant lines, a first sensor and a controller. The refrigerant lines fluidly connect the at least one compressor, the condenser, and the plurality of evaporators to form a refrigerant circuit for circulating the refrigerant.

In one embodiment, the plurality of evaporators includes a first evaporator and a second evaporator fluidly coupled to each other in parallel. The plurality of shut-off valves includes a first shut-off valve and a second shut-off valve. The first shut-off valve is installed at a refrigerant inlet of the first evaporator and the second shut-off valve is installed at a refrigerant outlet of the first evaporator. The first sensor is configured to perform one or more of the following: (i) measure temperature of the first evaporator and (ii) measure airflow passing over the first evaporator. The controller is electrically coupled to the first sensor and configured to control the operation of the first and second shut-off valves in accordance with the measured temperature or the measured airflow or both. In some embodiments, the controller is configured to automatically close the first and second shut-off valves when the measured temperature of the first evaporator is lower than a first predetermined temperature, or when the measured airflow passing over the first evaporator is less than a first predetermined volume, and to automatically open the first and second shut-off valves when the measured temperature of the first evaporator exceeds the first predetermined temperature, or when the measured airflow passing over the first evaporator is equal to or greater than the first predetermined volume.

In an embodiment, the plurality of shut-off valves includes a third shut-off valve and a fourth shut-off valve. The third shut-off valve is installed at a refrigerant inlet of the second evaporator and the fourth shut-off valve is installed at a refrigerant outlet of the second evaporator to prevent refrigerant from collecting in the second evaporator. In some embodiments, the third shut-off valve and the fourth shut-off valve are controlled to prevent refrigerant from collecting in the second evaporator when airflow over the second evaporator is less than a second predetermined volume. In some embodiments, the system includes a second sensor configured to perform one or more of the following: (iii) measure temperature of the second evaporator and (iv) measure airflow passing over the second evaporator. In some embodiments, the controller is electrically coupled to the second sensor and configured to control the operation of the third and fourth shut-off valves in accordance with the measured temperature and the measured airflow. In some embodiments, the controller is configured to automatically close the third and fourth shut-off valves when the measured temperature of the second evaporator is lower than a second predetermined temperature, or when the measured airflow passing over the second evaporator is less than a second predetermined volume, and to automatically open the third and fourth shut-off valves when the measured temperature of the second evaporator exceeds the second predetermined temperature, or when the measured airflow passing over the second evaporator is equal to or greater than the second predetermined volume.

The systems of the present invention have other features and advantages that will be apparent from or are set forth in more detail in the accompanying drawings, which are incorporated herein, and the following Detailed Description, which together serve to explain certain principles of the present invention.

BRIEF DESCRIPTION OF THE DRAWINGS

The accompanying drawings, which are incorporated into and constitute a part of this specification, illustrate one or more embodiments of the present application and, together with the detailed description, serve to explain the principles and implementations of the application.

DETAILED DESCRIPTION

Figure 1:
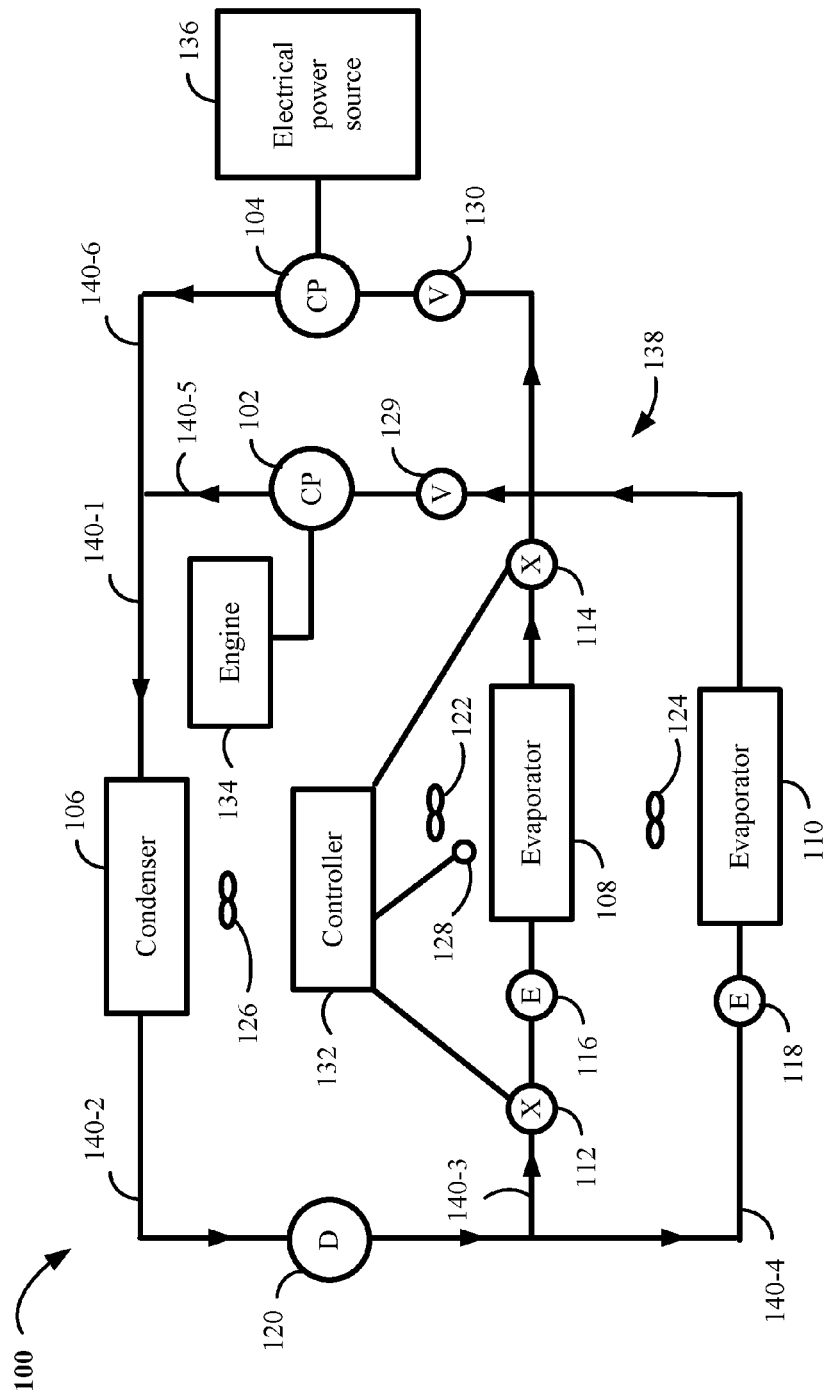
FIG. 1 is a block diagram illustrating a first exemplary air conditioning system.

Reference will now be made in detail to implementations of the present application as illustrated in the accompanying drawings. The same reference indicators will be used throughout the drawings and the following detailed description to refer to the same or like parts. Those of ordinary skill in the art will realize that the following detailed description of the present application is illustrative only and is not intended to be in any way limiting. Other embodiments of the present application will readily suggest themselves to such skilled persons having benefit of this disclosure.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

Many modifications and variations of this disclosure can be made without departing from its spirit and scope, as will be apparent to those skilled in the art. The specific embodiments described herein are offered by way of example only, and the disclosure is to be limited only by the terms of the appended claims, along with the full scope of equivalents to which such claims are entitled.

Embodiments of the present invention are described in the context of air conditioning systems for use in vehicles, and in particular, in the context of air conditioning systems to cool different compartments or different spaces of an over-the-road or off-road vehicle. The vehicle can be a car, a van, a truck, a bus, a trailer, or other automobiles.

Generally, an air conditioning system of the present invention includes at least one compressor, a condenser, a plurality of evaporators and refrigerant lines. The refrigerant lines fluidly connect the compressor, condenser and evaporators to form a refrigerant circuit. The air conditioning system of the present invention also includes a plurality of shut-off valves disposed at the refrigerant circuit to prevent undesired collection of refrigerant in one or more of the evaporators, and thus enhance the cooling effect or capacity of the HVAC systems. In some embodiments, the air conditioning system of the present invention includes a controller electrically coupled to the shut-off valves to control the operation of the valves. In some embodiments, the controller is electrically coupled to other components of the air conditioning system (e.g., a compressor or a condenser or both) to control operation of these components.

By way of illustration, FIG. 1 depicts an air conditioning system (100) including a first compressor (102), a second compressor (104), a condenser (106), a first evaporator (108), a second evaporator (110), a first shut-off valve (112) and a second shut-off valve (114). The first and second compressors, the condenser, the first and second evaporators, and the first and second valves are fluidly connected by refrigerant lines (104-1, 104-2, etc.) to form a refrigerant circuit (138).

In the illustrated embodiment, the first and second compressors (102, 104) are fluidly connected to each other in parallel by refrigerant lines (140-5, 140-6) and are configured for compressing a refrigerant. In some embodiments, the first compressor (102) is configured to connect to an internal combustion engine of the vehicle and is driven through a belt and pulley system by the internal combustion engine when the internal combustion engine is running. In some embodiments, the second compressor (104) is configured to operate when the internal combustion engine (134) of the vehicle is not running, for example, by connecting to an electrical power source (136) such as a battery. With the first and second compressors (102, 104) in place, the air conditioning system of the present invention can be operated when the engine is on as well as when the engine is off. In some embodiments, the first and second compressors (102, 104) are belt-driven compressors, electrically-driven compressors, or any other suitable compressors.

Figure 2:
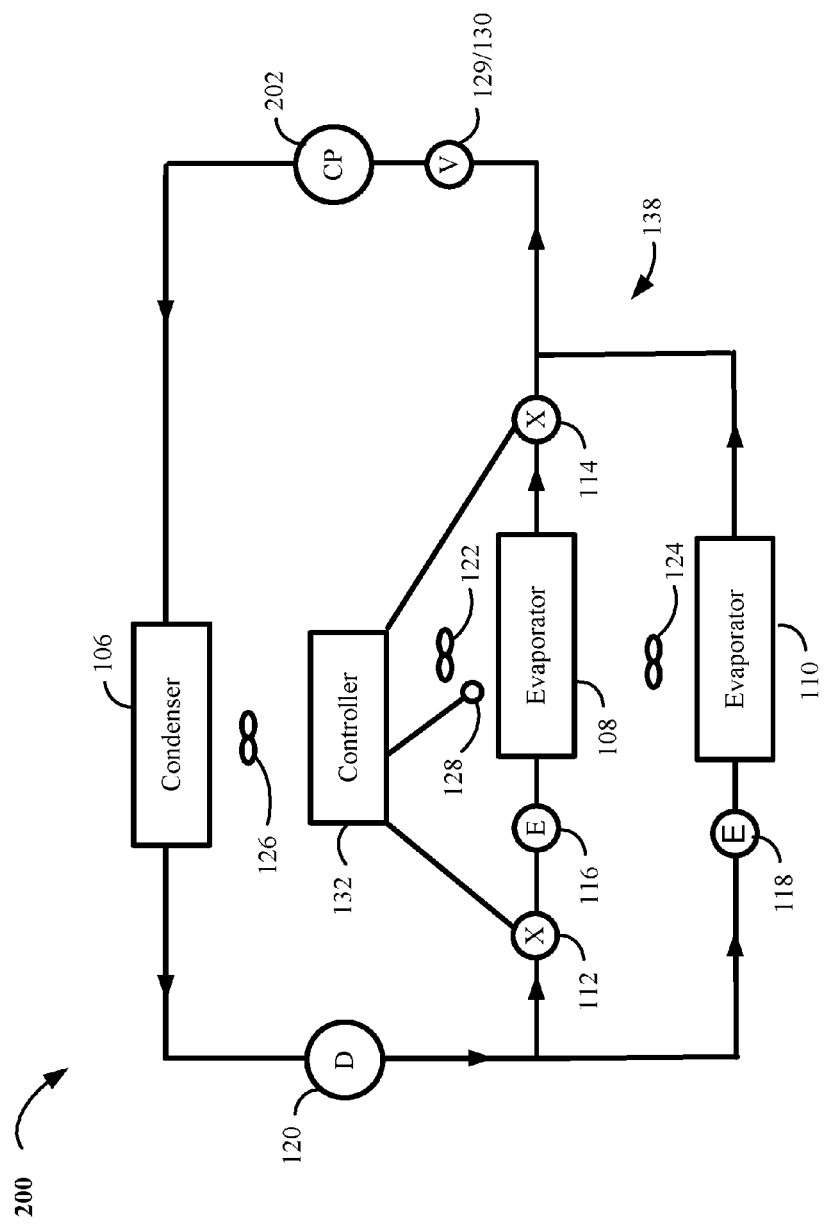
FIG. 2 is a block diagram illustrating a second exemplary air conditioning system.

In some embodiments, an air conditioning system of the present invention has one compressor. For example, as illustrated in FIG. 2, the air conditioning system (200) of the present invention has one compressor (202). The compressor (202) can be a compressor driven by the engine (e.g., the same as or similar to the first compressor 102 in FIG. 1) or driven by a battery or other power sources (e.g., the second compressor 104 in FIG. 1).

Turning back to FIG. 1, the condenser (106) is disposed downstream of the first and second compressors (102, 104) and fluidly connected to the first and second compressors (102, 104) by a refrigerant line (140-1). The condenser (106) is configured to condense the refrigerant compressed by the first or second compressor or both. As used herein, the term "downstream" refers to a position along a refrigerant line in the direction of the refrigerant flow. As used herein, the term "upstream" refers to a position along a refrigerant line opposite to the direction of the refrigerant flow. For example, FIG. 1 illustrates the condenser (106) disposed downstream of the first and second compressors (102, 104) and upstream of the evaporator (108), where the directions of the refrigerant flow are indicated by the arrows.

The first and second evaporators (108, 110) are disposed downstream of the condenser (106) and fluidly connected to the condenser (106) by a refrigerant line (140-2). The first and second evaporators (108, 110) are fluidly coupled to each other in parallel via refrigerant lines (140-3, 140-4) and configured to evaporate the condensed refrigerant. The first shut-off valve (112) is installed at the refrigerant inlet of the first evaporator (108), and the second shut-off valve (114) is installed at the refrigerant out of the first evaporator (108).

As used herein, the term "refrigerant inlet" refers to an inlet of a corresponding evaporator and a portion of a refrigerant line upstream of the corresponding evaporator. As used herein, the term "refrigerant outlet" refers to an outlet of a corresponding evaporator and a portion of a refrigerant line downstream of the corresponding evaporator. For example, refrigerant inlet of the first evaporator (108) refers to the inlet of the first evaporator (108) and a portion of the refrigerant line (140-3) upstream of the first evaporator (108). Refrigerant outlet of the first evaporator (108) refers to the outlet of the first evaporator (108) and a portion of the refrigerant line (140-3) downstream of the first evaporator (108).

In some embodiments, the first evaporator (108) is in thermal communication with a first compartment and the second evaporator (110) is in thermal communication with a second compartment to cool the first and second compartments. As used herein, the term "in thermal communication" refers to one or more of the following: (i) the respective evaporator is mounted within a corresponding compartment to exchange heat with that compartment or with the air in that compartment, and (ii) the respective evaporator is coupled with a device (e.g., heat exchanger or air blower) which introduces conditioned air into that compartment.

In some embodiments, the first evaporator (108) is mounted in the first compartment and the second evaporator (110) is mounted in the second compartment. In some embodiments, the first compartment can be separated from the second compartment, for example, by a wall or other barrier such as a curtain. In some embodiments, the first compartment and the second compartment are different areas within the same space. In some embodiments, the first compartment is a cab compartment, a sleeper compartment, or any other compartment in a vehicle.

Figure 5:
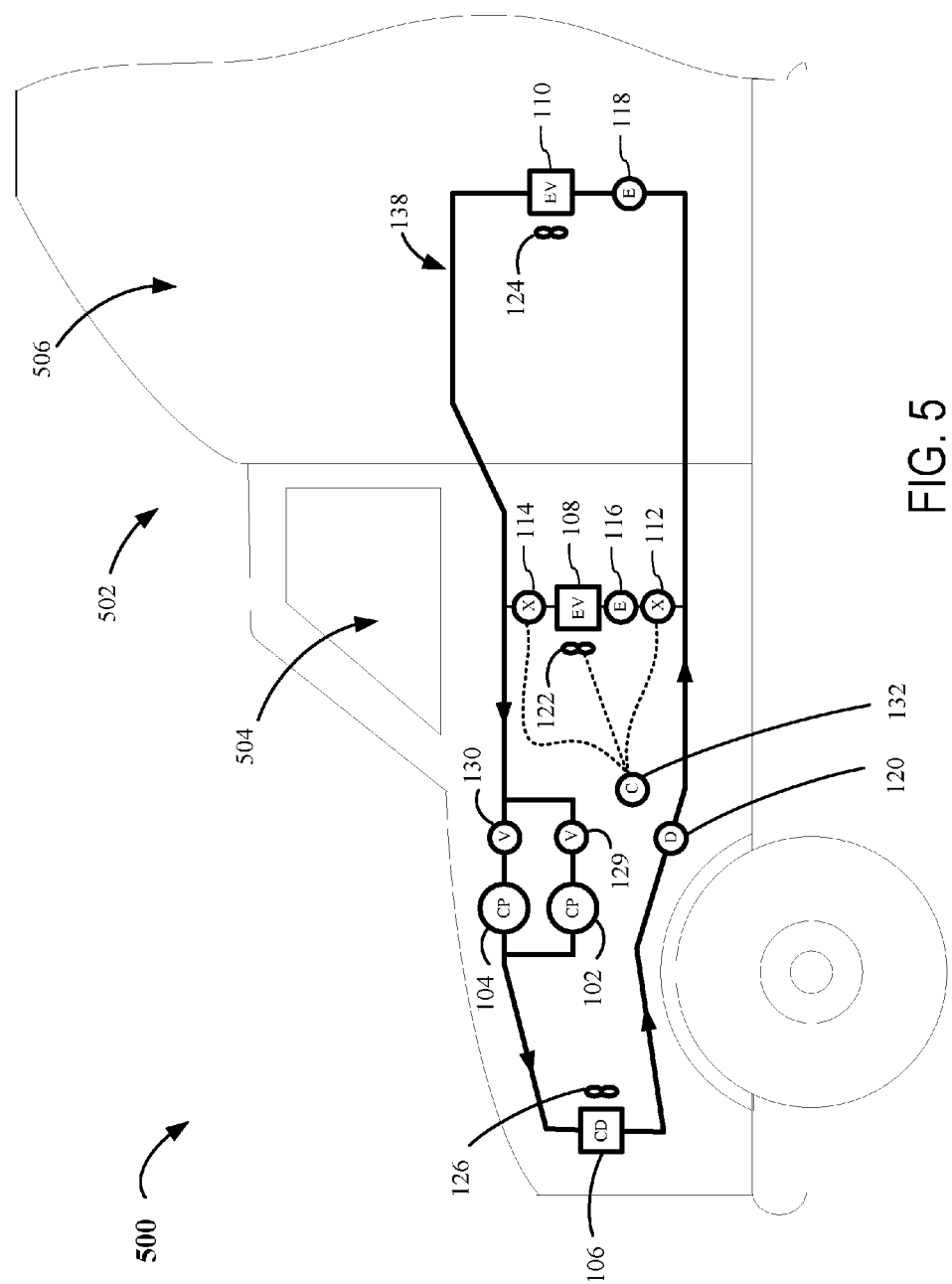
FIG. 5 is a schematic diagram illustrating an implementation of an air conditioning system in a vehicle.

As an example, FIG. 5 illustrates an implementation of the air conditioning system (100) in a vehicle (502). The vehicle (502) has a cab compartment (504) where an operator or driver operates the vehicle and a sleeper compartment (506) where the operator or driver can rest. In the illustrated embodiment, first evaporator (108) is in thermal communication with the cab compartment (504), while second evaporator (110) is in thermal communication with the sleeper compartment (506).

When cooling is desired in both cab and sleeper compartments, first and second shut-off valves (112, 114) are opened, either manually or automatically, so that the condensed refrigerant flows through both the first and second evaporators (108, 110) and provides cooling to both the cab and sleeper compartments. When cooling is only desired in the sleeper compartment (e.g., when the vehicle is parked and no one is in the cab compartment), the first and second shut-off valves (112, 114) are closed. Since the first and second shut-off valves (112, 114) are installed at both the refrigerant inlet and outlet of the first evaporator (108), closing the first and second shut-off valves (112, 114) prevents the refrigerant from entering the first evaporator (108) from both sides and thus prevents the refrigerant from collecting or accumulating in the first evaporator (108). As a result, the condensed refrigerant flows only through the second evaporator (110) and thus enhances the cooling effect of the second evaporator (110).

Figure 6:
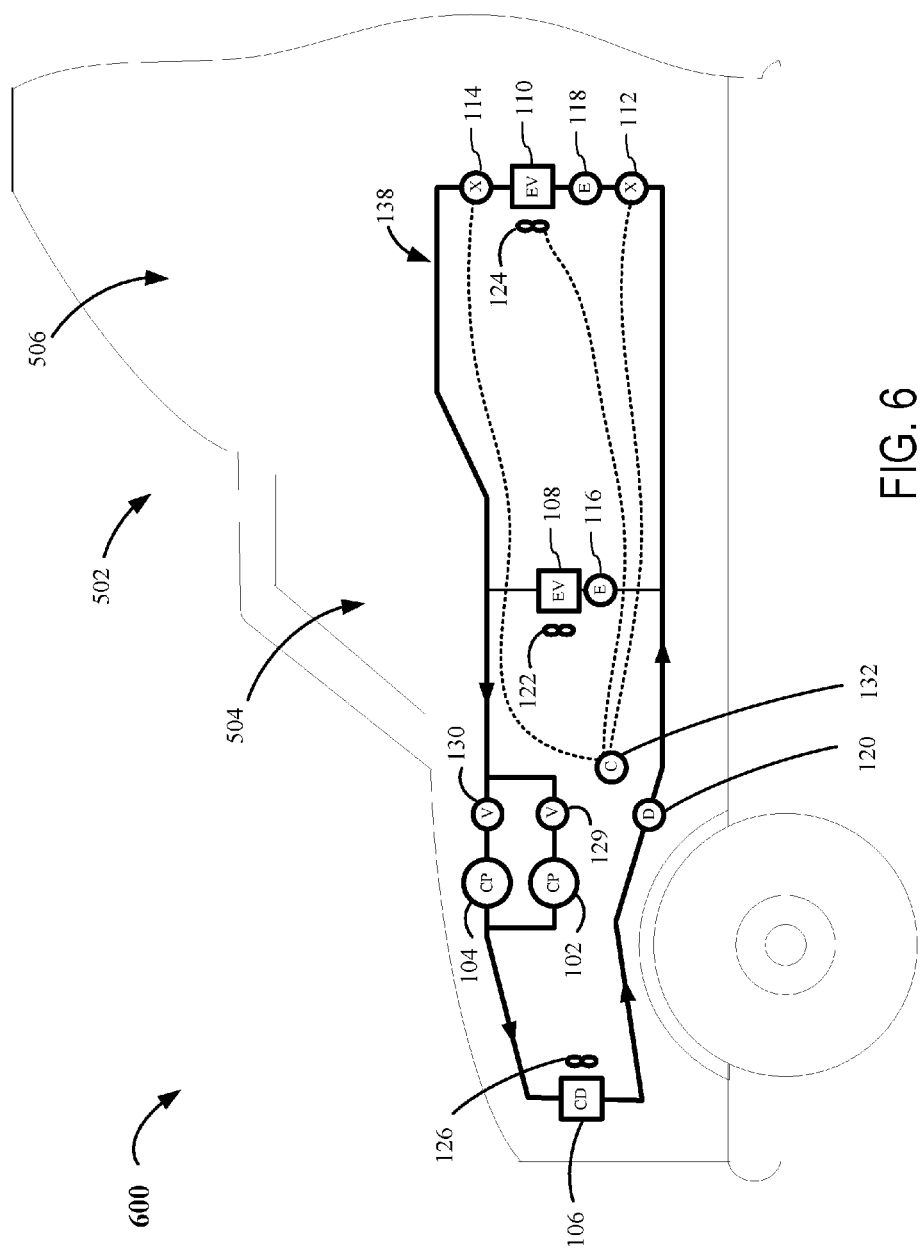
FIG. 6 is a schematic diagram illustrating an alternative implementation of an air conditioning system in a vehicle.

As another example, FIG. 6 illustrates an alternative implementation of the air conditioning system (100) of the present invention in the vehicle (502), where the first evaporator (108) is in thermal communication with the sleeper compartment (506) and the second evaporator (110) is in thermal communication with the cab compartment (504). In such an embodiment, when cooling is desired in both the cab and sleeper compartments, the first and second shut-off valves (112, 114) are opened, either manually or automatically, so that the condensed refrigerant flows through both the first and second evaporators (108, 110) and provides cooling to both cab and sleeper compartments. When cooling is only desired in the cab compartment (e.g., no one is in the sleeper compartment), the first and second shut-off valves (112, 114) are closed. Similar to the embodiment illustrated in FIG. 5, closing the first and second shut-off valves (112, 114) prevents the refrigerant from entering into the first evaporator (108) from both sides and thus prevents the refrigerant from collecting or accumulating in the first evaporator (108). As a result, the condensed refrigerant flows only through the second evaporator (110) and thus enhances the cooling effect of the second evaporator (110).

In some embodiments, the first and second shut-off valves are operated (e.g., opened or closed) manually, for example, by a driver of the vehicle who desires more cooling in a compartment/area or wants no cooling at all in the compartment/area. In some embodiments, the first or second shut-off valve or both are operated automatically, for example, by a controller (132). In some embodiments, operating the first and second shut-off valves depends on other parameters or operations of other components in the air conditioning system. For example, when airflow over the first evaporator is less than a first predetermined volume (e.g., indicating cooling is undesired in the compartment associated with the first evaporator), the first and second shut-off valves are manually or automatically closed to prevent refrigerant from collecting in the first evaporator. The first predetermined volume can be preset or reset in accordance with the type of vehicle, compartments associated with the first evaporator, preference of the drivers/operators/passengers, ambient temperature or other parameters. In an example, the first predetermined volume is at most 75 Cubic Feet per Minute (CFM), indicating cooling is undesired in the compartment associated with the first evaporator.

Figure 3:
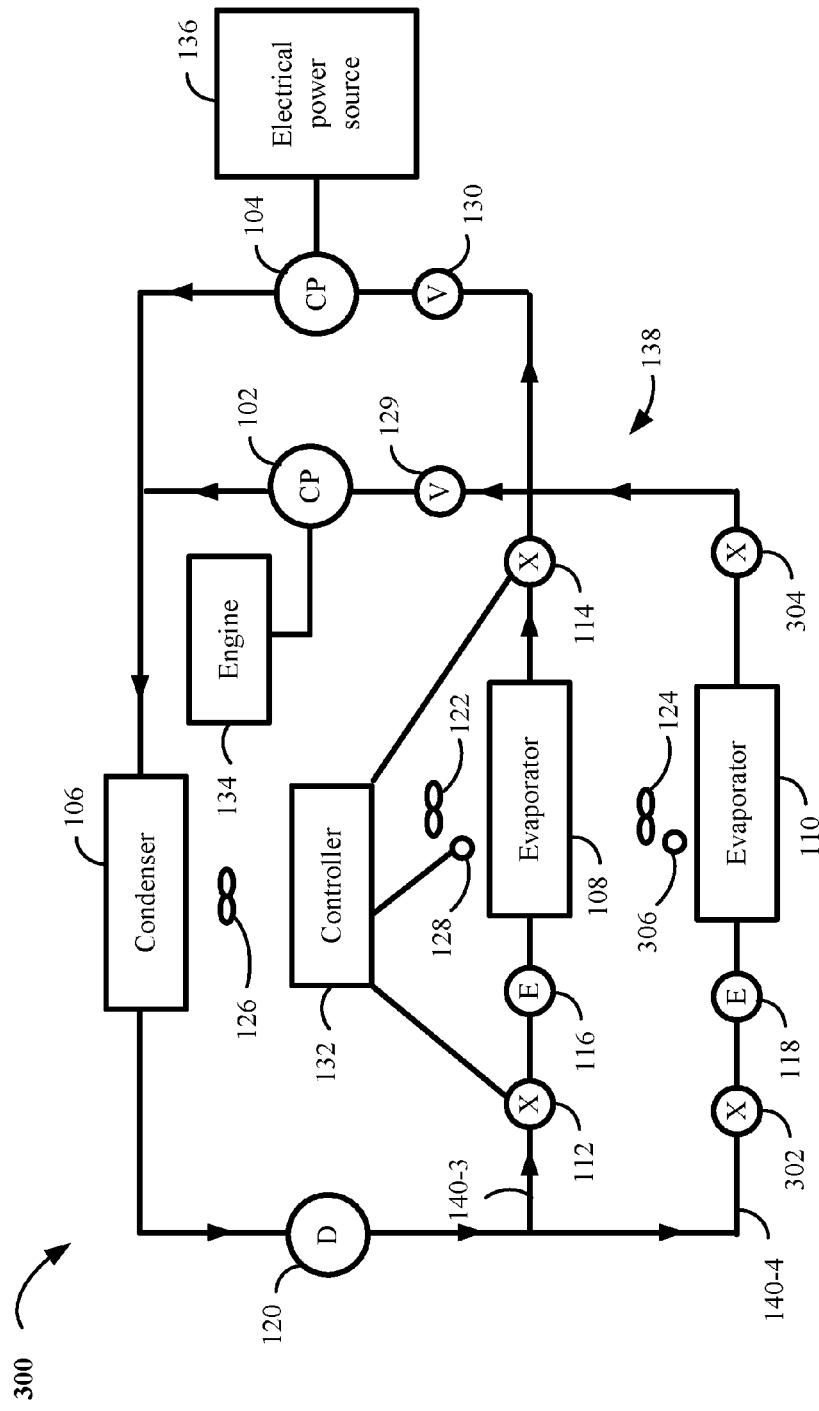
FIG. 3 is a block diagram illustrating a third exemplary air conditioning system.
Figure 7:
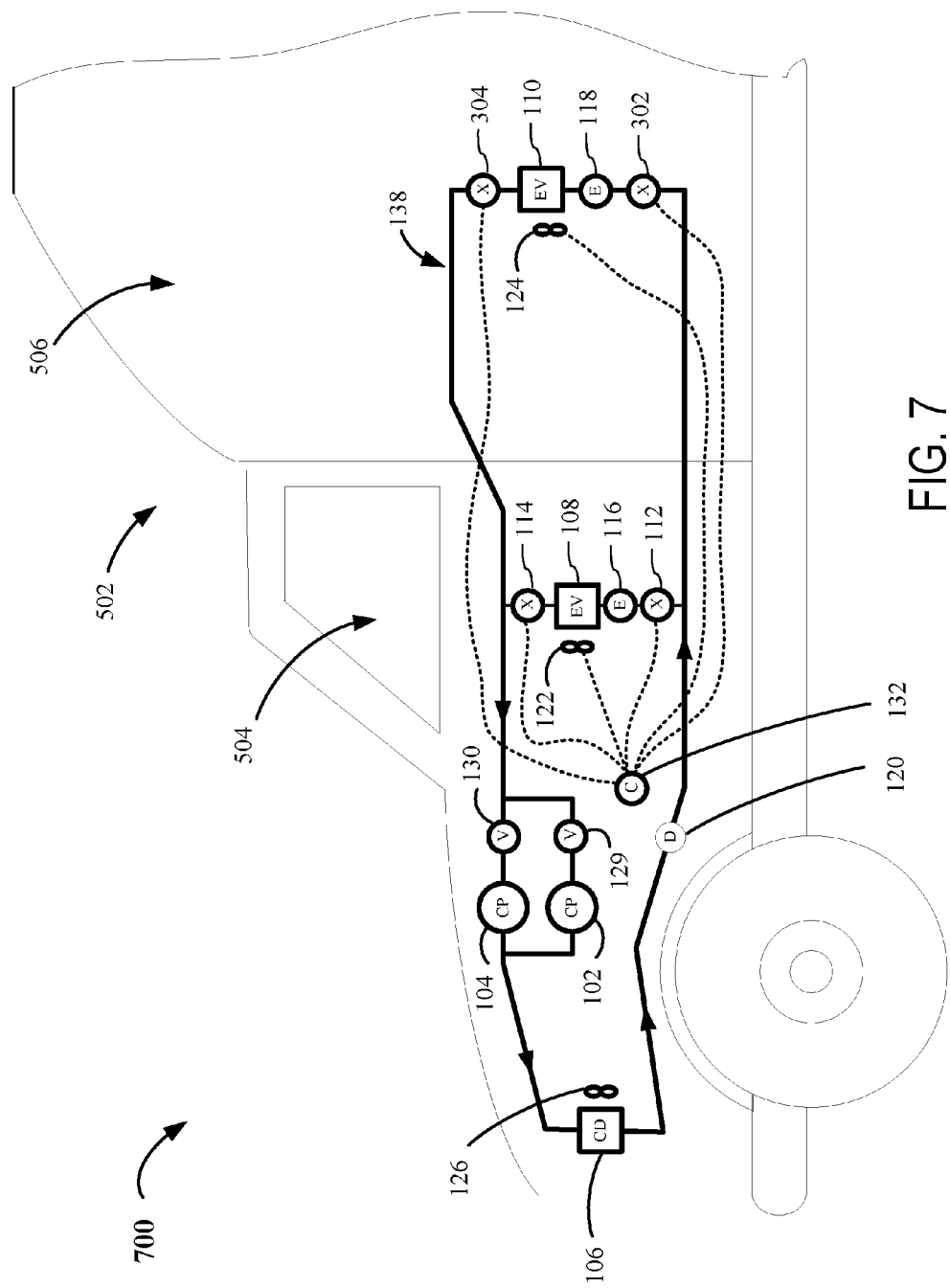
FIG. 7 is a schematic diagram illustrating another alternative implementation of an air conditioning system in a vehicle.

In some embodiments, an air conditioning system of the present invention includes more than two shut-off valves. As an example, FIG. 3 illustrates an air conditioning system (300) having four shut-off valves, and FIG. 7 depicts an implementation of the air conditioning system (300) in the vehicle (502). In addition to the first and second shut-off valves (112, 114), the air conditioning system (300) includes a third shut-off valve (302) and a fourth shut-off valve (304). The third and fourth shut-off valves (302, 304) are installed at the refrigerant inlet and outlet of the second evaporator (110). Like the first and second shut-off valves (112, 114), the third and fourth shut-off valves (302, 304) can be opened/closed, manually or automatically. Similar to the first and second shut-off valves (112, 114), closing the third and fourth shut-off valves (302, 304) prevents the refrigerant from entering into the second evaporator (110) from both sides and thus prevents the refrigerant from collecting or accumulating in the second evaporator (110). As a result, the condensed refrigerant flows only through the first evaporator (108) and thus enhances the cooling effect of the second evaporator (108).

Like the first and second shut-off valves (112, 114), operation of the third and fourth shut-off valves (302, 304) can depend on other parameters or operations of other components in the air conditioning system. In some embodiments, the first, second, third and fourth shut-off valves are selectively and independently controlled. For example, when airflow over the second evaporator is less than a second predetermined volume (e.g., indicating cooling is undesired in the compartment associated with the second evaporator), the third and fourth shut-off valves are manually or automatically closed to prevent refrigerant from collecting in the second evaporator. Like the first predetermined volume, the second predetermined volume can be preset or reset in accordance with the type of vehicle, compartments associated with the second evaporator, desire of drivers/operators, or other parameters. The second predetermined volume can be the same as or different from the first predetermined volume. In an example, the second predetermined volume is at most 75 Cubic Feet per Minute (CFM), indicating cooling is undesired in the compartment associated with the second evaporator.

Turning back to FIG. 1, in some embodiments, the air conditioning system (100) of the present invention includes a first sensor (128) and a controller (132) electrically coupled to the first sensor (128). In some embodiments, the control (132) is an intelligent power generation management controller described in U.S. Publication No. 2007/0131408 and U.S. Pat. Nos. 7,591,143 and 8,453,722, all of which are expressly incorporated by reference in their entirety, and in particular with reference to intelligent power generation management controllers.

The first sensor (128) is configured to perform one or more of the following: (i) measure temperature of the first evaporator (108) and (ii) measure the airflow passing over the first evaporator (108). When the measured temperature is lower than a first predetermined temperature, or the measured airflow passing over the first evaporator (108) is less than the first predetermined volume (e.g., 75 CFM), or both, the controller (132) automatically closes or sends instruction to close the first and second shut-off valves (112, 114). When the measured temperature exceeds the first predetermined temperature or when the measured airflow passing over the first evaporator is equal to or greater than the first predetermined volume, the controller (132) automatically opens or sends instruction to open the first and second shut-off valves (112, 114). In some embodiments, the controller (132) is electrically coupled to one or more other components in the air conditioning system. For example, in one embodiment, the controller (132) is electrically coupled to the first compressor (102) or the second compressor (104) or both to automatically control the operation of the compressors in accordance with ambient temperature, operation of the engine, the cooling demand of the compartments of the vehicle, or other parameters.

In some embodiments, the air conditioning system (100) of the present invention includes a plurality of control valves to selectively restrict or permit flow of the refrigerant to the compressors. As an example, FIG. 1 illustrates the air conditioning system (100) having a first flow control valve (129) and a second flow control valve (130). The first flow control valve (129) is disposed at the refrigerant line (104-5) upstream of the first compressor (102) and configured to selectively restrict or permit flow of the refrigerant to the first compressor (102). The second flow control valve (130) is disposed at the refrigerant line (104-6) upstream of the second compressor (104) and configured to selectively restrict or permit flow of the refrigerant to the second compressor (104). In some embodiments, the operation of the flow control valves is automatically controlled by the controller.

In some embodiments, the air conditioning system (100) of the present invention includes a plurality of metering devices to control flow of the refrigerant into the evaporators. As an example, FIG. 1 illustrates the air conditioning system (100) having a first metering device (116) and a second metering device (118). The first metering device (116) is disposed at the refrigerant line (104-3) between the first shut off valve (112) and the first evaporator (108) and configured for controlling flow rate of the refrigerant into the first evaporator (108). The second metering device (118) is disposed at the refrigerant line (104-4) upstream of the second evaporator (110) and configured for controlling flow rate of the refrigerant into the second evaporator (110). In some embodiments, the first and the second metering devices are thermal expansion valves. In some embodiments, the operation of the metering devices is automatically controlled by the controller.

In some embodiments, the air conditioning system (100) of the present invention includes a receiver/drier (120). The receiver/drier (120) is disposed at the refrigerant line (104-3) between the condenser (106) and the evaporators (108, 110). The receiver/drier (120) is configured to temporarily store the refrigerant, absorb moisture from the refrigerant, or both.

In some embodiments, the air conditioning system (100) of the present invention includes a plurality of air blowers to enhance the performance of some components in the air conditioning system. As an example, FIG. 1 illustrates the air conditioning system (100) having a first air blower (122), a second air blower (124) and a third air blower (126). The first air blower (122) is positioned proximate the first evaporator (108) and configured to blow air over the first evaporator (108). The air is cooled when passed over the first evaporator (108) and can be introduced into a compartment for cooling purpose. Similarly, the second air blower (124) is positioned proximate the second evaporator (110) and configured to blow air over the second evaporator (110). The air is cooled when passing the second evaporator (110) and can be introduced into another compartment or a different area of the same compartment for cooling purpose. The third air blower (126) is positioned proximate the condenser (106) and configured to blow air over the condenser (106) to cool it. When passing over the condenser (106), the air extracts the heat away from the condenser (106) and thus enhances the performance of the condenser (106).

Referring now to FIG. 3, in some embodiments, the air conditioning system (300) of the present invention includes more than one sensor for measuring airflows over the evaporators. For example, in addition to the first sensor (128), the air conditioning system (300), as illustrated, includes a second sensor (306) configured to perform one or more of the following: (iii) measure temperature of the second evaporator and (iv) measure the airflow passing over the second evaporator (116). In some embodiments, the controller (132) is electrically coupled to both the first and second sensors (128, 306) and configured to automatically control the first, second, third and fourth shut-off valves (112, 114, 302, 304) based on the measured temperatures or the measured airflows. In some embodiments, the controller (132) is configured to automatically perform or send instructions to perform one or more of the following: (i) close the first and second shut-off valves (112, 114) when the measured temperature of the first evaporator (108) is lower than a first predetermined temperature, or when the measured airflow passing over the first evaporator (108) is less than a first predetermined volume; (ii) open the first and second shut-off valves (112, 114) when the measured temperature of the first evaporator (108) exceeds the first predetermined temperature, or when the measured airflow passing over the first evaporator (108) is equal to or greater than the first predetermined volume; (iii) close the third and fourth shut-off valves (302, 304) when the measured temperature of the second evaporator (110) is lower than a second predetermined temperature, or when the measured airflow passing over the second evaporator (110) is less than a second predetermined volume; and (iv) open the third and fourth shut-off valves (302, 304) when the measured temperature of the second evaporator (110) exceeds the second predetermined temperature, or when the measured airflow passing over the second evaporator (110) is equal to or greater than the second predetermined volume. In some embodiments, one or more of the first, second, third and fourth shut-off valves (112, 114, 302, 304) are performed manually and selectively in accordance with the measured temperatures, airflows, or other factors.

Figure 4:
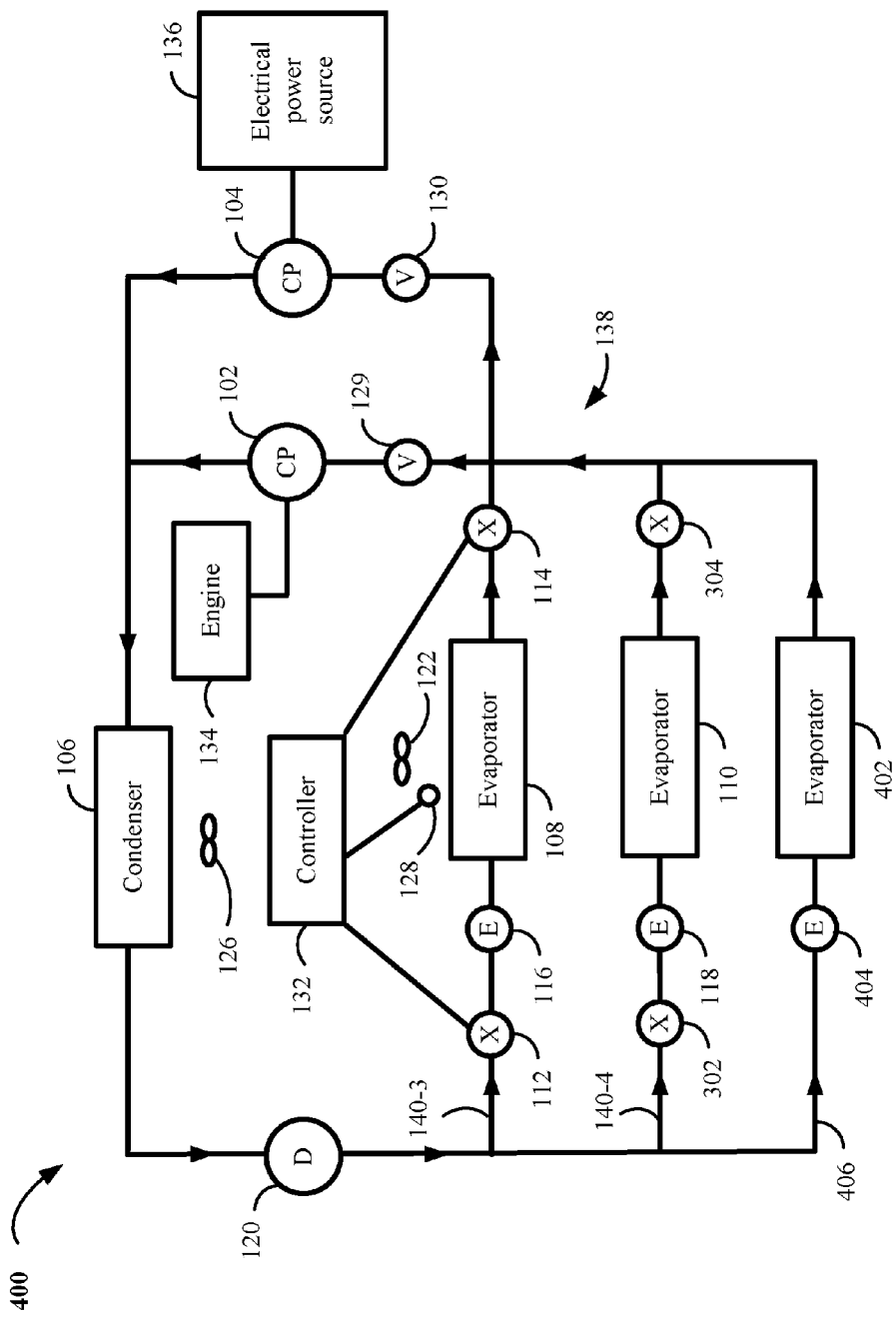
FIG. 4 is a block diagram illustrating a fourth exemplary air conditioning system.

In some embodiments, an air conditioning system of the present invention includes more than two evaporators. As an example, FIG. 4 illustrates an air conditioning system (400) having three evaporators. In addition to the first and second evaporator (108, 110), the air conditioning system (400) includes a third evaporator (402). The third evaporator (402) is fluidly coupled to the first and second evaporators (108, 110) in parallel by refrigerant lines (140-3, 140-4, 406). The third evaporator (402) is in thermal communication with a third compartment. The third compartment can be a compartment separated from the first and second compartments or an area in the first or second compartment. In some embodiments, the air conditioning system (400) includes a third metering device (404) disposed at the refrigerant line (406) upstream of the third evaporator (402). The third metering device (404) is configured to control flow of the refrigerant into the third evaporator (402).

In some embodiments, the air conditioning system (400) includes the first and second shut-off valves (112, 114) installed at the refrigerant inlet and outlet of the first evaporator (108) to prevent undesired collection of the refrigerant in the first evaporator (108). In some embodiments, the air conditioning system (400) further includes the third and fourth shut-off valves, such as those (302, 304) illustrated in FIG. 3, installed at the refrigerant inlet and outlet of the second evaporator (110) to prevent undesired collection of the refrigerant in the second evaporator (110). In some embodiments, the air conditioning system (400) further includes another pair of shut-off valves installed at the refrigerant inlet and outlet of the third evaporator (402) to prevent undesired collection of the refrigerant in the third evaporator (402).

In some embodiments, an air conditioning system of the present invention is electrically, fluidly, thermally or mechanically coupled with other components, devices or systems. For example, an air conditioning system (e.g., 100, 200, 300, or 400) of the present invention is combined with a heating system to form a combined heating and cooling air conditioning system. The combination of an air conditioning system with a heating system can be achieved in a similar way as those described in U.S. Pat. No. 8,517,087, which is expressly incorporated by reference in their entirety, and in particular with reference to the heating system.

As another example, an air conditioning system (e.g., 100, 200, 300, or 400) of the present invention is coupled to a vehicle ventilation module to provide conditioned fresh air to the desired compartment(s). The vehicle ventilation module can be the same as or similar to those described in U.S. Publication No. 2014/0262132, which is expressly incorporated by reference in their entirety, and in particular with reference to the vehicle ventilation module.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will be understood that, although the terms "first," "second," etc. may be used herein to describe various elements, these elements should not be limited by these terms. These terms are only used to distinguish one element from another. For example, a first evaporator could be termed a second evaporator, and, similarly, a second evaporator could be termed a first evaporator, without changing the meaning of the description, so long as all occurrences of the "first evaporator" are renamed consistently and all occurrences of the "second evaporator" are renamed consistently.

What is claimed is:

1. An air conditioning system for use in a vehicle having two or more compartments, the air conditioning system comprising:
a plurality of compressors for compressing refrigerant into a compressed refrigerant, the plurality of compressors including:
a first compressor configured to connect to an internal combustion engine of the vehicle and be driven by the internal combustion engine when the internal combustion engine is running; and
a second compressor fluidly coupled in parallel to the first compressor and configured to operate when the internal combustion engine of the vehicle is not running;
a condenser disposed downstream of the first compressor and the second compressor and configured to condense the compressed refrigerant;
a plurality of evaporators disposed downstream of the condenser and configured to evaporate the condensed refrigerant, the plurality of evaporators including a first evaporator and a second evaporator, wherein:
the first evaporator and the second evaporator are fluidly coupled to each other in parallel;
the first evaporator is in thermal communication with a cab compartment of the vehicle to cool the cab compartment; and
the second evaporator is in thermal communication with a sleeper compartment of the vehicle to cool the sleeper compartment;
a plurality of shut-off valves including a first shut-off valve and a second shut-off valve, wherein the first shut-off valve is installed at a refrigerant inlet of the first evaporator and the second shut-off valve is installed at a refrigerant outlet of the first evaporator to prevent refrigerant from collecting in the first evaporator;
refrigerant lines fluidly connecting the plurality of compressors, the condenser, and the plurality of evaporators to form a refrigerant circuit for circulating the refrigerant; and
a controller communicatively coupled to the plurality of compressors and the first and second shut-off valves, the controller configured to operate the first and second shut-off valves and the plurality of compressors, including adjusting operation of the plurality of compressors based on whether the internal combustion engine of the vehicle is running.

2. The air conditioning system of claim 1, further comprising a first sensor configured to measure airflow passing over the first evaporator; and
wherein the controller is electrically coupled to the first sensor and configured to:
automatically close the first and second shut-off valves when the measured airflow passing over the first evaporator is less than a first predetermined volume, and
automatically open the first and second shut-off valves when the measured airflow passing over the first evaporator is equal to or greater than the first predetermined volume.

3. The air conditioning system of claim 2, wherein first predetermined volume is based on one or more occupant preferences.

4. The air conditioning system of claim 1, wherein the controller is configured to automatically control operation of the plurality of compressors in accordance with cooling demand of the two or more compartments of the vehicle.

5. The air conditioning system of claim 1, wherein the first evaporator is mounted in the cab compartment of the vehicle.

6. The air conditioning system of claim 1, wherein the plurality of evaporators further includes a third evaporator fluidly coupled to the first and second evaporators in parallel and in thermal communication with a third compartment of the two or more compartments of the vehicle.

7. The air conditioning system of claim 1, wherein the second compressor is an electrically driven compressor.

8. The air conditioning system of claim 1, further
a first flow control valve disposed upstream of the first compressor and configured to selectively restrict or permit flow of the refrigerant to the first compressor; and
a second flow control valve disposed upstream of the second compressor and configured to selectively restrict or permit flow of the refrigerant to the second compressor.

9. The air conditioning system of claim 1, further comprising:
a first metering device disposed between the first shut off valve and the first evaporator and configured for controlling flow rate of the refrigerant into the first evaporator; and
a second metering device disposed upstream of the second evaporator and configured for controlling flow rate of the refrigerant into the second evaporator.

10. The air conditioning system of claim 9, wherein the first and the second metering devices are thermal expansion valves.

11. The air conditioning system of claim 1, further comprising a receiver component disposed between the condenser and the plurality of evaporators and configured for performing one or more of the following:
temporarily storing the refrigerant; and
absorbing moisture from the refrigerant.

12. The air conditioning system of claim 1, wherein the plurality of shut-off valves include a third shut-off valve and a fourth shut-off valve, wherein the third shut-off valve is installed at a refrigerant inlet of the second evaporator and the fourth shut-off valve is installed at a refrigerant outlet of the second evaporator to prevent refrigerant from collecting in the second evaporator.

13. The air conditioning system of claim 12, further comprising:
a first sensor configured to measure airflow passing over the first evaporator;
a second sensor configured to measure airflow passing over the second evaporator; and
a controller electrically coupled to the first and second sensors and configured to:

automatically close the first and second shut-off valves when the measured airflow passing over the first evaporator is less than a first predetermined volume, automatically open the first and second shut-off valves when the measured airflow passing over the first evaporator is equal to or greater than the first predetermined volume, automatically close the third and fourth shut-off valves when the measured airflow passing over the second evaporator is less than a second predetermined volume, and automatically open the third and fourth shut-off valves when the measured airflow passing over the second evaporator is equal to or greater than the second predetermined volume.

14. The air conditioning system of claim 13, wherein the second predetermined volume is at most 75 Cubic Feet per Minute (CFM).

15. The air conditioning system of claim 12, wherein the controller is further configured to operate the third and fourth shut-off valves.

16. The air conditioning system of claim 1, further comprising:
a first air blower positioned proximate the first evaporator and configured to blow air over the first evaporator;
a second air blower positioned proximate the second evaporator and configured to blow air over the second evaporator, and
a third air blower positioned proximate the condenser and configured to blow air over the condenser.

17. The air conditioning system of claim 1, wherein the controller is further configured to operate the first and second shut-off valves based on occupant preferences.

18. The air conditioning system of claim 1, wherein the controller is further configured to operate the first and second shut-off valves based on a type of the vehicle.

19. The air conditioning system of claim 1, wherein the controller is further configured to operate the air conditioning system in a first mode, a second mode, and a third mode; and wherein:
in the first mode, both the first evaporator and the second evaporator are in operation and receiving the condensed refrigerant;
in the second mode, the first evaporator is in operation and receiving the condensed refrigerant while the second evaporator is not in operation and is not receiving the condensed refrigerant; and
in the third mode, the second evaporator is in operation and receiving the condensed refrigerant while the first evaporator is not in operation and is not receiving the condensed refrigerant.

20. An air conditioning system for use in a vehicle, the air conditioning system comprising:
at least one compressor for compressing a refrigerant into a compressed refrigerant;
a condenser disposed downstream of the at least one compressor for condensing the compressed refrigerant;
a plurality of evaporators disposed downstream of the condenser for evaporating the condensed refrigerant, the plurality of evaporators including a first evaporator and a second evaporator, wherein the first evaporator and the second evaporator are fluidly coupled to each other in parallel;
a plurality of shut-off valves including a first shut-off valve and a second shut-off valve, wherein the first shut-off valve is installed at a refrigerant inlet of the first evaporator and the second shut-off valve is installed at a refrigerant outlet of the first evaporator to prevent refrigerant from collecting in the first evaporator when airflow over the first evaporator is less than a first predetermined volume;
refrigerant lines fluidly connecting the at least one compressor, the condenser, and the plurality of evaporators to form a refrigerant circuit for circulating the refrigerant;
a first sensor configured to measure airflow passing over the first evaporator; and
a controller electrically coupled to the first sensor, the at least one compressor, and the first and second shut-off valves, the controller configured to:
automatically close the first and second shut-off valves when the measured airflow passing over the first evaporator is less than a first predetermined volume, and
automatically open the first and second shut-off valves when the measured airflow passing over the first evaporator is equal to or greater than the first predetermined volume.

21. The air conditioning system of claim 20, wherein:
the first evaporator is in thermal communication with a cab compartment of the vehicle to cool the cab compartment; and
the second evaporator is in thermal communication with a sleeper compartment of the vehicle to cool the sleeper compartment.

* * * * *